Feb. 2, 1943.　　　F. W. WOHLFIELD　　　2,309,724
FENDER SHIELD CONSTRUCTION AND ASSEMBLY
Filed June 5, 1941　　　2 Sheets-Sheet 1
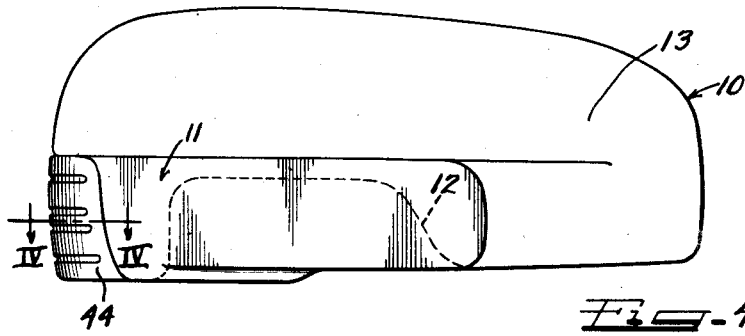
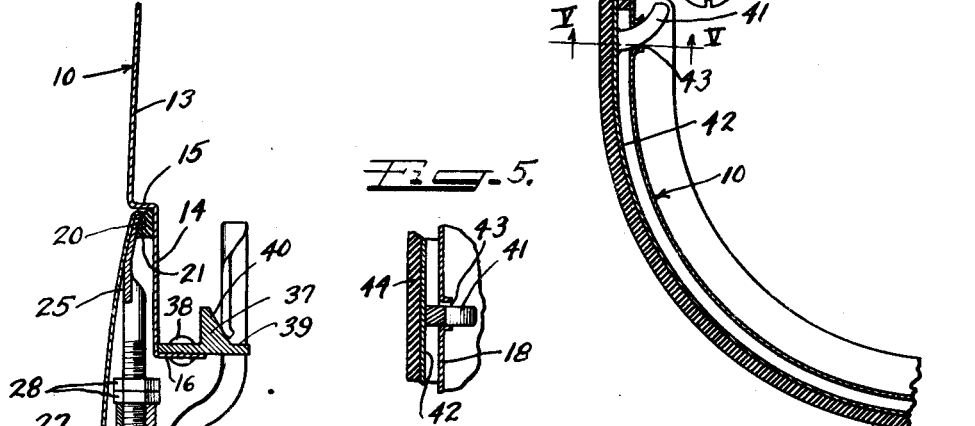
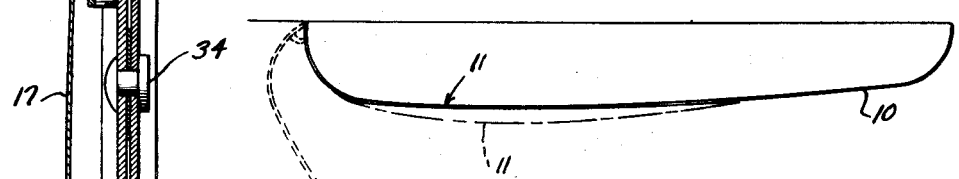
Inventor
FREDERICK W. WOHLFIELD.

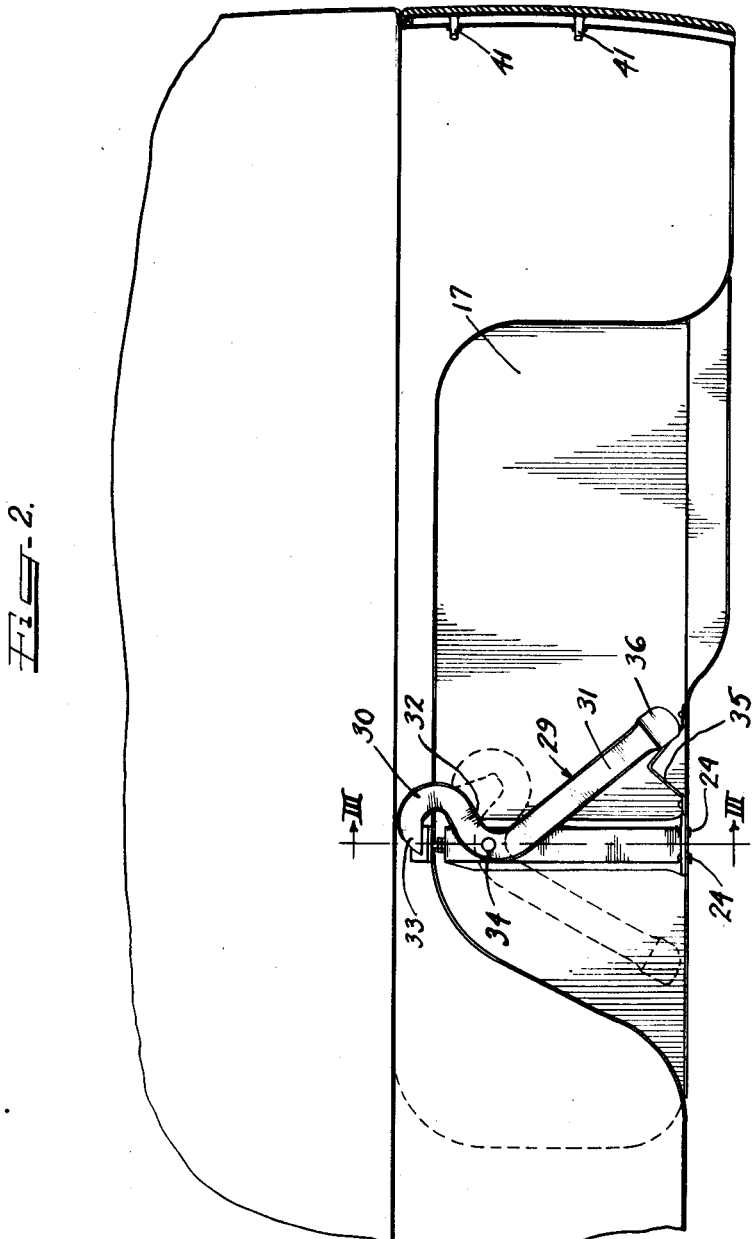

Patented Feb. 2, 1943

2,309,724

UNITED STATES PATENT OFFICE 2,309,724

FENDER SHIELD CONSTRUCTION AND ASSEMBLY

Frederick W. Wohlfield, Detroit, Mich., assignor to Houdaille-Hershey Corporation, Detroit, Mich., a corporation of Michigan Application June 5, 1941, Serial No. 396,691

5 Claims. (Cl. 280—153)

This invention relates to a fender shield construction and assembly, and more particularly to a fender shield of novel design having novel means thereon for detachably securing the fender shield to a fender or other vehicle body part.

In the vehicle industry, and particularly in the automobile industry, various means have been utilized to improve the appearance of vehicle fenders. The usual vehicle fender is provided with an opening which affords access to the vehicle wheel, and which permits the ready removal of the wheel in an axial direction. Since this opening inherently presents an ugly outward appearance, detachable fender shields have been employed to substantially cover this opening.

As the term "fender shield" shall hereinafter be employed, it refers to any member which is adapted to be secured to a fender or other portion of a vehicle body for the purpose of covering the opening in the fender or vehicle body which is provided for access to and removal of the vehicle wheel. Furthermore, as the term "fender" shall hereinafter be employed, it refers to any form of wheel fender in its broad sense, whether such fender be separate from the vehicle body part, partly separate from the vehicle body part, or actually an integral part of the vehicle body, and whether or not it projects outwardly away from the principal body portion of the vehicle.

It is an object of the present invention to provide a fender shield construction and assembly of novel design and particularly a fender shield having novel means for securing a fender shield to a vehicle fender.

It is a further object of this invention to provide a fender shield and fender shield assembly which is economical to manufacture and which is rugged and reliable in use.

It is a still further object of the present invention to provide novel means for supporting and clamping a fender shield on a vehicle fender or other vehicle body part.

Another object of this invention is to provide a fender shield which not only overlies a portion of the outer depending side wall of the fender but which also extends around over a portion of the front end of the fender.

The novel features which I believe to be characteristic of my invention are set forth with particularity in the appended claims. My invention itself, both as to its organization and manner of construction, together with further objects and advantages thereof, may best be understood by reference to the accompanying drawings, in which:

Figure 1 is a front elevational view of a vehicle fender and a fender shield assembly;

Figure 2 is an enlarged rear elevational view of the fender and fender shield assembly shown in Figure 1;

Figure 3 is an enlarged vertical sectional view of the assembly taken along the line III—III of Figure 2;

Figure 4 is a horizontal fragmentary sectional view of the forward end of the assembly as taken along the line IV—IV of Figure 1;

Figure 5 is a fragmentary sectional view taken along the line V—V of Figure 4; and Figure 6 is a diagrammatic view showing the manner in which the fender shield is rocked into position on the fender.

Referring now to the various figures of the drawings, which illustrate one embodiment of the present invention, there is illustrated therein a vehicle fender 10 having a fender shield 11 mounted thereon over the wheel access opening 12 in the outer depending side wall 13 of the fender 10. While the fender 10 may assume a wide variety of shapes without departing from the spirit and scope of the present invention, and may, indeed, be formed integral and made a part of the body itself (not shown), the fender 10 has been illustrated as being of a high crowned type. The fender shield 11 is detachably mounted on the fender 10 and is positioned to cover the relatively large opening 12 in the outer side wall 13 of the fender 10 which is conventionally provided in substantially all vehicle fenders to permit access to and removal of the vehicle wheel therethrough.

The lower portion of the outer depending side wall 13 of the fender 10 is inwardly offset as at 14. This inwardly offset portion 14 extends almost entirely across the lower half of the fender 10 but gradually fades out so that at the extreme rear end of the fender 10 there is no offset portion (see Figure 1). The offset portion 14 is of course integrally connected with the principal depending side wall portion 13 by a connecting flange 15, the fender 10 being stamped from a single sheet of material.

Surrounding the opening 12 the offset portion 14 is provided with an inwardly bent flange 16 to increase the stiffness of the fender at this point.

The fender shield 11 comprises a sheet metal panel 17 which is large enough to cover the entire wheel access opening 12 as well as overlie the entire lower forward portion of the fender 10. More specifically, it is dimensioned to be positioned snugly around the lower front face 18 of the fender 10 and then back over a sufficient portion of the fender 10 to entirely cover the wheel access opening 12. The lower edge of the panel 17 is shaped as shown in Figures 1 and 2 of the drawings, and is provided with a bent back base flange 19.

The top and end edges of the fender shield 11 are bent back in a flange portion 20 upon which is mounted a rubber edging or cushioning strip 21 which may be secured or bonded thereto in any suitable manner well known to those skilled in the art.

The fender shield 11 is reinforced by a strut 22 which extends upwardly behind the panel 17 from the lower edge 19 to a point in proximity to the top of the fender shield 11. This strut 22 has a base portion 23 which is seated on the base flange 19 and riveted or bolted thereto as at 24. In order that the strut 22 may possess sufficient rigidity without an undue amount of metal being employed therefor, it is preferably channel shaped in cross section.

Mounted on top of the strut 22 is a vertically adjustable plate member 25 which extends up into engagement with the rubber cushioning strip 21 at the top of the fender shield. The novel features of this strut and the novel manner in which it may be secured to the fender shield is described and claimed in the copending application for patent of Herbert S. Jandus entitled "Fender shield and mounting means therefor," United States Serial No. 271,915, filed May 5, 1939, and assigned to the same assignee as the present invention. It is sufficient for the purposes of the present application that it be explained that the substantially vertically adjustable plate 25 is carried on a threaded stud 26 which extends down into a recess formed by the upper portion of the stud 22 and a strap bracket 27 which is secured to the stud 22. A pair of nuts 28 are fitted onto the threaded shank of the stud 26 and are tightened down against the top of the strut 22 to force the plate 25 upwardly into tight engagement with the top bent back edge of the fender shield 11.

Mounted on the strut 22 is a latching lever and fender shield supporting arm 29 which includes a relatively short leg portion 30 and a relatively long leg portion 31. The short leg portion 30 extends away from the long leg portion 31 at approximately right angles thereto as at 32 and then is bent back on itself in a generally U-shaped formation 33. The latching and supporting arm 29 is mounted on the strut 22 by means of a mounting stud or rivet 34 which provides a pivotal mounting for the lever at this point. The long leg portion 31 extends downwardly to the bottom of the assembly and is seated on a bracket 35, the lower end 36 of the lever 29 being bent out and downwardly for that purpose.

Secured to the flange 16 of the fender 10 at a point opposite the upper end of the leg portion 30 of the latching arm 29 is a cam plate 37. This plate 37 is riveted or otherwise secured to the flange 16 as at 38 and includes a horizontally extending lip portion 39 and an inclined cam surface portion 40. By virtue of the shape of the leg portion 30 it will readily be seen that as the latching arm is rocked from the dotted line position as shown in Figure 2 to the full line position as shown in Figure 2, the end of the leg portion 30 rides down the cam surface 40 to pull the shield tightly against the offset portion 14 of the fender 10 and in addition provides vertical support for the fender at this point.

The forward end of the fender shield 11 is vertically supported and latched into position by means of a pair of arcuate fingers 41 secured on the inner face of the fender shield 11 at the front end thereof. These fingers 41 project arcuately toward the rear of the vehicle and inwardly toward the body of the vehicle as is clearly shown in Figure 4. As has previously been described, the front end of the fender shield is curved to extend around the front end 18 of the fender 10 as at 42 (Figure 4). Opposite the fingers 41 slots are provided in the forward end portion 18 of the fender 10 through which the fingers 41 project.

As will best be understood by reference to Figure 6, the fender shield is held with the front vertical edge of the fender shield at the junction of the fender with the vehicle body and in the position as shown by the uniformly broken line in Figure 6. The fender shield is then rocked to the position as shown by the long and short broken line in Figure 6. This rocking movement of the fender shield in a horizontal plane causes the fingers 41 to pass through the slots 43 in the fender 10. As an inspection of Figure 4 of the drawings will show outward displacement of the fender shield away from the side of the car is prevented by virtue of the fact that the fingers 41 are in engagement with the outer edge of the slots 43. Furthermore, the fender shield is vertically supported at this point by virtue of the engagement of the fingers 41 with the bottom of the slot 43 as is shown in Figure 5.

The fender shield is then moved from the position as shown by the long and short broken lines in Figure 6 to the position shown in full lines in Figure 6 by rocking the locking and support arm 29 from its dotted line position shown in Figure 2 to its full line position shown in Figure 2. This causes the fender shield to be bowed in at its center (i. e., flattened out) and also causes vertical support in latching of the rear end of the fender shield against the fender 10.

In the illustrated embodiment of the invention the fender shield 11 is provided with a rubber scuff pad 44 as shown in Figure 1 of the drawings.

While I have shown a particular embodiment of my invention it will, of course, be understood that I do not wish to be limited thereto, as many modifications may be made and I, therefore, contemplate by the appended claims to cover all such modifications as fall within the true spirit and scope of my invention.

I claim as my invention:

1. A closure member for covering the wheel opening in the outer depending wall of a high crowned fender, said fender having a rounded front wall, said closure member being shaped to extend entirely around the rounded front wall of said fender and over a substantial portion of the side wall including that portion which includes the wheel opening, and means on said closure member for detachably securing the same to said fender.

2. A closure member for covering the wheel opening in the outer depending wall of a high crowned fender, said fender having a rounded front wall, said closure member being shaped to extend entirely around and overlie the rounded front wall of said fender and to extend back and overlie a substantial portion of the side wall including that portion which includes the wheel opening, means on said closure member for pivotally supporting said closure member on said fender for movement about substantially a vertical axis, and latching means on said closure member a point remote from said pivot means for detachably supporting and latching the rear end of said closure member on said fender.

3. A closure member for covering the wheel opening in the outer depending wall of a high crowned fender, said fender having a rounded front wall, said closure member being shaped to extend entirely around and overlie the rounded front wall of said fender and to extend back and overlie a substantial portion of the side wall including that portion which includes the wheel opening, hinge means on said closure member in proximity to its front edge, said hinge means being arranged to detachably engage said fender to support said closure member thereon for pivoted movement in substantially a horizontal plane, and latching and supporting means on said closure member for detachably engaging and securing said closure member to said fender at a point in proximity to the top of said opening.

4. A closure member for covering a wheel opening in the outer depending wall of a high crowned fender, said fender having a rounded front wall, said closure member being shaped to extend around the rounded front wall of said fender and over a substantial portion of the side wall including that portion which includes the wheel opening, at least one rearwardly and inwardly extending arcuate arm on said closure member adjacent its front edge, said arcuate arm being arranged to extend through a complementary opening in the front wall of said fender, supporting and latching means on said closure member located on the rear half portion of said closure member for detachably supporting and securing said closure member on said fender.

5. A closure member for covering the wheel opening in the outer depending wall of a high crowned fender, said fender having a rounded front wall, said closure member being shaped to extend around the rounded front wall of said fender and over a substantial portion of the side wall including that portion which includes the wheel opening, a pair of arcuate fingers extending rearwardly and inwardly from the back face of the front portion of said fender shield, said arcuate fingers being arranged to extend through complementary openings in said fender thereby to pivotally support said closure member on said fender for movement in substantially a horizontal plane, and a latching arm on said closure member arranged to lie within the opening in said fender when said closure member is in mounted position thereon, said latching member being pivotally mounted on the rear face of said closure member and having a long handle portion extending obliquely downwardly from its pivot point and having a short U-shaped leg portion arranged to be wrapped into hooked engagement with said fender, the hooked engagement providing both lateral and vertical support for said closure member.

FREDERICK W. WOHLFIELD.